United States Patent [19]

MacMillan

[11] 4,190,405
[45] Feb. 26, 1980

[54] HEATING DEVICE FOR A TIRE RETREADING MOLD

[75] Inventor: Kenneth T. MacMillan, Macon, Ga.

[73] Assignee: Donald MacMillan & Son, Inc., Macon, Ga.

[21] Appl. No.: 4,578

[22] Filed: Jan. 18, 1979

[51] Int. Cl.² .............................................. B29H 5/04
[52] U.S. Cl. ........................................ 425/20; 425/41; 249/78
[58] Field of Search .................. 425/11, 17, 19, 20, 425/21, 22, 23, 24, 25, 40, 41

[56] References Cited

U.S. PATENT DOCUMENTS

| | | | |
|---|---|---|---|
| 2,570,657 | 10/1951 | Fannen | 425/20 |
| 2,801,443 | 8/1957 | Duerksen | 425/41 |
| 2,970,346 | 2/1961 | Fannen | 425/41 X |
| 3,088,171 | 5/1963 | MacMillan | 425/41 X |
| 3,170,193 | 2/1965 | Fike | 425/20 |
| 3,339,241 | 9/1967 | Fike | 425/20 |
| 3,778,203 | 12/1973 | MacMillan | 425/20 |

*Primary Examiner*—J. Howard Flint, Jr.
*Attorney, Agent, or Firm*—Diller, Ramik & Wight

[57] ABSTRACT

This disclosure is directed to a heating device particularly adapted for tire treading and/or retreading matrices and includes a body having a continuously unending channel formed in an exterior peripheral surface of the matrix body in which is disposed an electric or steam heating element having opposite end portions in lapping relationship with the heating element being generally encased in a body of cast metallic material, and means in the form of a generally Z-shaped spacer traversing the channel and separating the solid material encasing the end portions on each other to permit the heating element to expand and/or contract.

15 Claims, 9 Drawing Figures

U.S. Patent     Feb. 26, 1980     4,190,405
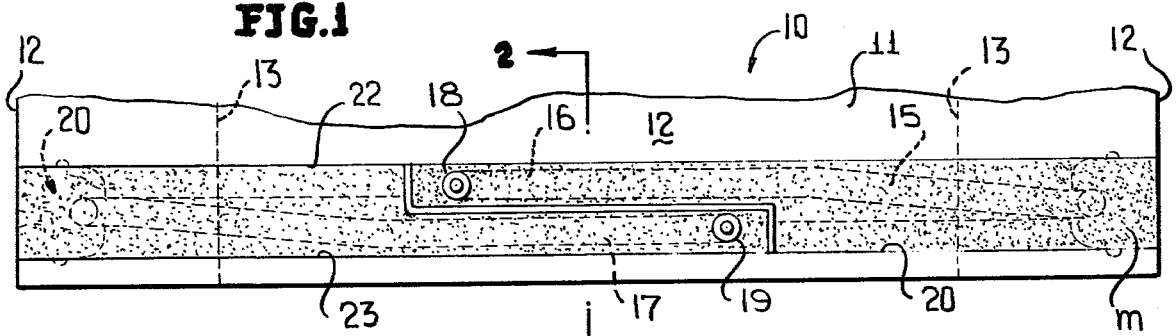
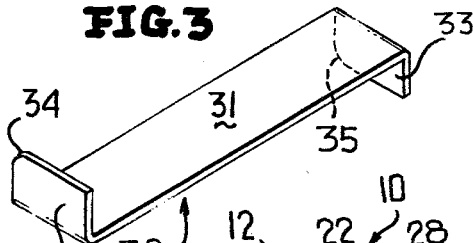
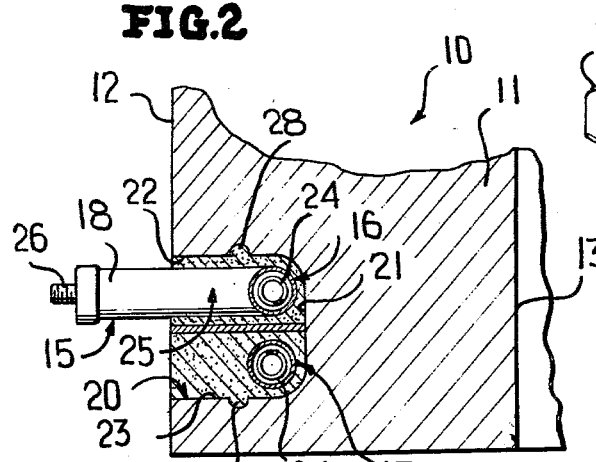
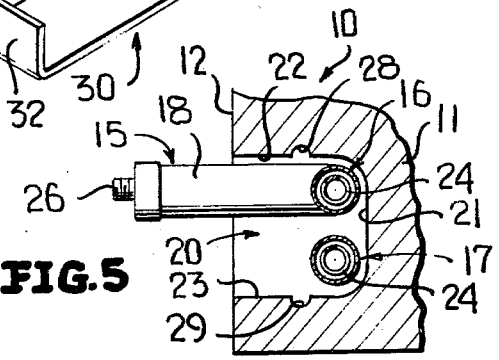
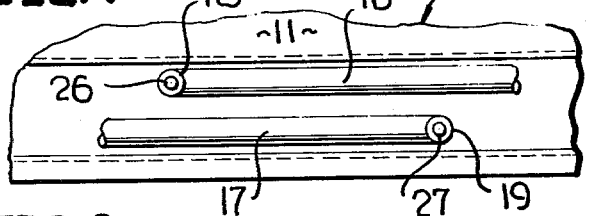
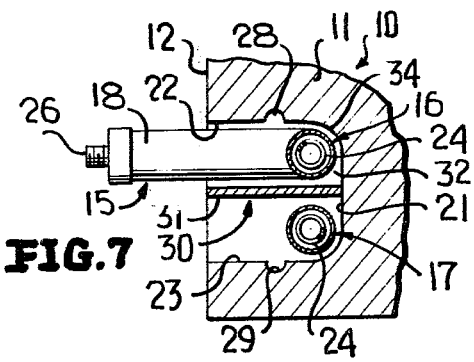
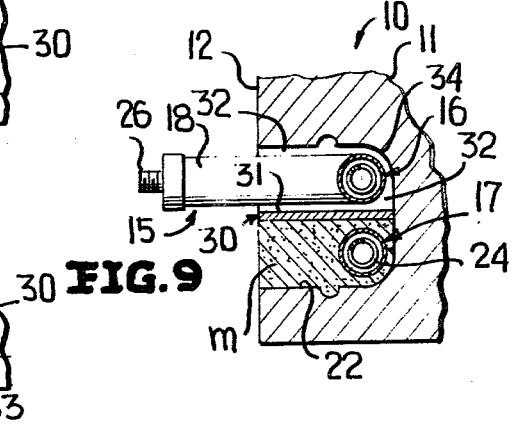
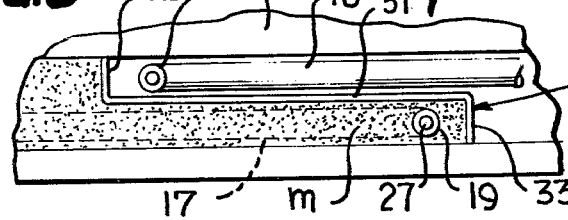

HEATING DEVICE FOR A TIRE RETREADING MOLD

BACKGROUND OF THE INVENTION

The present invention is directed to an improvement in tire treading or retreading matrices which include heating elements encased in a casting of aluminum or like metal in the manner disclosed in U.S. Pat. No. 3,088,171 issued May 7, 1963.

It has been noted that when heating elements (electrical or steam) are encased in molten material poured in a channel of a matrix, subsequent use causes failure of the heating elements because the terminal ends thereof do not have sufficient clearance within which to compensate for differences in expansion and/or contraction. In other words, when a heating element which is totally encased in a solid casting expands or contracts, any difference in relative expansion or contraction between the heating element and its casing relative to the material in which it is encased and the matrix which it surrounds will at times cause failure as, for example, by breaking the connection between the electrical coil and the connecting pin of the heating element (CALROD) likewise, such stresses caused during expansion and contraction while the matrix is in use could cause a steam coil to crack of separate from its fittings. In either case past efforts of correcting this problem, including those set forth in the latter-noted patent, proved unsatisfactory both from the standpoint of manufacturing which was a relatively difficult and time consuming operation and while in use.

In keeping with the foregoing, it is a primary object of the present invention to avoid the latter-noted and other disadvantages in both the manufacture and operation of heating devices which though specifically directed to matrices for prior treading or retreading operations are equally applicable as any type of a heating device in which a heating element, be it electrical, steam or the like, is encased in a body which is subject to expansion and/or contraction.

Another object of this invention is to provide a novel heating device specifically including a body having a continuous unending channel therein in which is disposed a heating element encased in a solid casting and means for traversing the channel and separating the solid material encasing opposite end portions of the heating elements whereby the latter are free to move relative to each other upon expansion and/or contraction of the heating elements, the material encasing the same and/or the body.

A further object of this invention is to provide a novel heating device of the type heretofore set forth wherein the traversing means is a spacer.

Another object of this invention is to provide a novel heating device of the type heretofore set forth wherein the end portions of the heating element are in lapping relationship and the transversing means is a spacer disposed between the lapping end portions of the heating element.

In the drawing:

FIG. 1 is a fragmentary side-elevational view of a heating device associate with a body or matrix, and illustrates a heating element encased in a solidified casting with a spacer separating encased overlapped end portions of the heating element;

FIG. 2 is an enlarged fragmentary sectional view taken generally line 2—2 of FIG. 1, and illustrates the manner in which a portion of the spacer separates the material encasing end portions of the heating element;

FIG. 3 is a perspective view of the spacer, and illustrates oppositely directed end portions thereof;

FIGS. 4, 6 and 8 are fragmentary side elevational views of the overlapped portions of the heating element and illustrate respectively the heating element disposed in the channel of the body, the spacer inserted in its position prior to pouring the encasing material, and the manner in which the spacer presents the material poured in one section of the channel from flowing into an adjacent section across the area of the overlap between the heating element end portions;

FIGS. 5, 7 and 9 are fragmentary sectional views taken generally along lines 5—5, 7—7 and 9—9 of FIGS. 4, 6 and 8, respectively, and illustrate details of the relationship of the elements described with respect to FIGS. 4, 6 and 8.

DETAILED DESCRIPTION OF THE INVENTION

A novel heating device constructed in accordance with this invention is generally designated by the reference numeral 10 (FIGS. 1 and 2) and includes a metallic body 11 which may be, for example, the matrix of a tire treading or retreading mold, and though the specific aspects of this invention are directed to the latter, the invention is equally applicable to any body which is heated and in turn heats individual articles, liquids, gases as, for example, electric irons, frying pans, boilers, etc.

The body 11 of the heating device 10 is of a generally annular configuration having an outer cylindrical peripheral surface 12 and an inner cylindrical peripheral surface 13 which may, for example, define a cavity within which may be inserted a vehicle tire which is retreaded in a conventional manner under pressure and heat conducted through the body 11 of the heating device 10 by means of heating means generally designated by the reference numeral 15.

The heating means 15 is a conventional heating element of a generally circular configuration surrounding the exterior surface 12 of the body 11 and having opposite end portions 16,17 in lapping relationship. Substantially the entirety of the heating element 15 including the lapping end portions 16,17 is housed within a channel 20 formed by a base wall 21, an upper wall 22 and a lower wall 23 (FIG. 2) which imparts a generally U-shape configuration to the channel 20. Exposed in 18,19 of the respective heating element end portions 16,17 project outwardly of the channel 20 beyond the outer surface 12 of the body 11, as is clearly evident in FIG. 2. An electrical resistor or heating coil 24 is housed within a sheath or covering 25 of the heating element 15 and opposite ends 26,27 are threaded (FIG. 2) in order that the same might connected in a conventional manner to a suitable source of electrical energy.

In manufacturing the heating device 10, the channel 20 may be simply cast therein or machined and in either case the upper and lower walls 22,23, respectively, are provided with circular grooves 28,29, the purpose of which will be readily apparent hereinafter. Once the channel 20 has been formed in the body 11 and the heating element has been positioned therein in the manner illustrated in FIG. 4, means generally designated by the reference numeral 30 is positioned between the overlapping end portions 16,17 of the heating element 15 in the manner best illustrated in FIGS. 6 and 7. The means 30 is a spacer formed of metallic, ceramic or like material which is resistant to elevated temperatures and includes a main body 31 of a generally rectangular configuration (FIG. 3) and oppositely directed ends 32,33 having respective rounded corners 34,35.

The spacer 30 is next positioned in the channel 20 in the manner illustrated in FIG. 6 with the ends 32,33 adjacent the ends 18,19, respectively, of the heating element 15 and the portion 31 between the overlapping or lapping portions 16,17 of the heating element 15. The curved corners 34,35 complement the curvature of the channel 20 at the corners (unnumbered end) or radii of the merging walls 21,22 and 23,24, respectively (FIG. 2). Conventional means (not shown) are provided for retaining or maintaining the heating element 15 within the channel 20 and spaced from the walls 21 through 23 thereof, in the manner readily apparent in FIGS. 2, 5, 7 and 9, and similar conventional means are also provided though not shown for holding the spacer 30 positioned in the manner readily apparent from FIGS. 2, 6 and 7 so that the spacer transversely spans the channel 20 from the wall 22 to the wall 23.

Once the heating element 15 and the spacer 30 are positioned in the manner shown in FIGS. 6 and 7, molten metal or other type of pourable or flowable material capable of setting, curing of solidifying is poured into the channel 20 in a conventional manner. This may be accomplished by placing a circular band in overlying relationship to the exterior surface 12 of the body 11 to completely close the channel 20 except for two holes through which project the ends 18,19 of the heating element 15, another hole serving as a pour opening, and if necessary a suitable vent. When the molten or like flowable material is poured into the pour opening, it flows into and progressively fills the entirety of the channel 20 until the latter is completely filled. FIG. 8 merely represents a graphic illustration of the manner in which the spacer 30 prevents the flowable material to one side of the spacer from crossing the spacer and flowing to the opposite side thereof. In actual practice the channel 20 will not be filled with the liquid in the manner illustrated in FIG. 8 as well as FIG. 9 since the flowable material seeks its own level and if poured into the channel with the heating device 10 positioned as shown in the drawings the flowable material will progressively build up or heighten from the lower wall 23 upwardly toward the upper wall 22.

Once the poured material M has solidified, the circular wall closing off the channel 20 may be removed and the heating device is fully operational needing only to have its connectors 26,27 connected to a suitable electrical potential. When in use the coil 24 is elevated in temperature and it in turn heats the casing or sheath 25, the solidified material M, the body 12 and whatever material (solid, liquid or gas) which may be within, against or associated with the surface 13 of the body 11. During this heating (or subsequent cooling) the differences in the various materials of the elements described as well as their characteristics of expansion and contraction might cause the heating element 15 or the material M solified and encasing the same to expand and/or contract. Should the latter occur, however, since the end portions 16,18 and the material M encasing the same tend to expand or contract such relative movement will be permitted due to the existence of the spacer 30 which in effect changes the solified material M from a solid ring to a ring having a transverse stepped slit thereacross to permit relative expansion and contraction of the ring and/or solidified material M and the associated embedded or encased heating element 15.

The contraction and expansion heretofore mentioned includes not only circumferential contraction and expansion but also radial contraction and expansion. In other words, due to the spacer 30, the end portion 16, 17 can shift circumferentially relative to each as well as radially which also gives it added degree of safety in operation. Due to this novel feature, stresses should not cause breaking or cracking of the casing 25, the electrical coil 24, the connection of the latter to the threaded connectors 26,27, etc., nor should like damage occur to a tubular steam conductor (not shown) or its fittings which may be substituted in keeping with this invention in lieu of the electrical heating element 15.

What is claimed is:

1. A heating device comprising a body having a continuous unending channel therein, a heating element disposed in said channel, said heating element having adjacent opposite end portions, said heating element being generally encased in a body of solid material disposed within said channel, and means formed separate and apart from said channel for traversing said channel and completely separating the solid material encasing one of said end portions from the solid material encasing another of said end portions whereby said end portions are free to move relative to each other upon expansion and/or contraction of said heating element.

2. The heating device as defined in claim 1 wherein said traversing means is a spacer.

3. The heating device as defined in claim 1 wherein said body is a tire matrix.

4. The heating device as defined in claim 1 wherein said body includes means defining a cavity within which is adapted to be received material to be heated by heat emanating from said heating element.

5. The heating device as defined in claim 1 wherein said body includes an outer peripheral surface, and said channel opens outwardly through said surface.

6. The heating device as defined in claim 1 wherein said body includes inner and outer surfaces, said inner surface defines a cavity within which is adapted to be received material to be heated by heat emanating from said heating element, and said channel opens outwardly through said outer surface.

7. The heating device as defined in claim 1 wherein said traversing means is a generally Z-shaped spacer.

8. The heating device as defined in claim 1 wherein said end portions and the material encasing the same are in lapping relationship with said traversing means being disposed at least in part therebetween.

9. The heating device as defined in claim 8 wherein said traversing means is a spacer.

10. The heating device as defined in claim 8 wherein said body is a tire matrix.

11. The heating device as defined in claim 8 wherein said body includes means defining a cavity within which is adapted to be received material to be heated by heat emanating from said heating element.

12. The heating device as defined in claim 8 wherein said body includes an outer peripheral surface, and said channel opens outwardly through said surface.

13. The heating device as defined in claim 8 wherein said body includes inner and outer surfaces, said inner surface defines a cavity within which is adapted to be received material to be heated by heat emanating from said heating element, and said channel opens outwardly through said outer surface.

14. The heating device as defined in claim 9 wherein said body includes an outer peripheral surface, and said channel opens outwardly through said surface.

15. The heating device as defined in claim 9 wherein said body includes inner and outer surfaces, said inner surface defines a cavity within which is adapted to be received material to be heated by heat emanating from said heating element, and said channel opens outwardly through said outer surface.

* * * * *